(12) United States Patent
Galzin et al.

(10) Patent No.: US 11,958,618 B2
(45) Date of Patent: Apr. 16, 2024

(54) EXCHANGER FOR COOLING WARM PRIMARY AIR WITH COOL SECONDARY AIR AND SYSTEM FOR AIR CONDITIONING PROVIDED WITH SUCH AN EXCHANGER

(71) Applicant: LIEBHERR-AEROSPACE TOULOUSE SAS, Toulouse (FR)

(72) Inventors: Guillaume Galzin, Toulouse (FR); Jean-Raymond Blary, Toulouse (FR); David Lavergne, Toulouse (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 443 days.

(21) Appl. No.: 17/435,515

(22) PCT Filed: Feb. 27, 2020

(86) PCT No.: PCT/FR2020/050387
§ 371 (c)(1),
(2) Date: Sep. 1, 2021

(87) PCT Pub. No.: WO2020/178505
PCT Pub. Date: Sep. 10, 2020

(65) Prior Publication Data
US 2022/0048636 A1 Feb. 17, 2022

(30) Foreign Application Priority Data
Mar. 1, 2019 (FR) ........................ 1902148

(51) Int. Cl.
*B64D 13/00* (2006.01)
*B64D 13/08* (2006.01)
*B64D 13/06* (2006.01)

(52) U.S. Cl.
CPC ...... *B64D 13/08* (2013.01); *B64D 2013/0618* (2013.01); *B64D 2013/0648* (2013.01); *B64D 2013/0674* (2013.01)

(58) Field of Classification Search
CPC ........ B64D 13/00; B64D 13/06; B64D 13/08; B64D 2013/0618; B64D 2013/0648;
(Continued)

(56) References Cited

U.S. PATENT DOCUMENTS 4,352,273 A * 10/1982 Kinsell ................. F28D 9/0062
165/166
4,562,885 A * 1/1986 Pausch .................... F28G 1/166
165/95

(Continued)

*Primary Examiner* — Phutthiwat Wongwian
*Assistant Examiner* — Sherman D Manley
(74) *Attorney, Agent, or Firm* — CRGO Global; Steven M. Greenberg

(57) ABSTRACT

Exchanger (16) for cooling hot primary air by means of cold secondary air, comprising: a plurality of channels (80) for the circulation of the secondary air; and a plurality of channels for the circulation of the primary air, characterized in that said exchanger further comprises: water circulation channels (83) each extending adjacently to a secondary channel (80); water-spray micro-perforated hollow bars (63) each extending adjacently to a primary channel (60) and fluidically connected to the micro-perforated hollow bars in order to be able to heat the water by interaction with the primary air before said water is sprayed into the flow of primary air at the inlet of the exchanger.

11 Claims, 2 Drawing Sheets

(58) Field of Classification Search
CPC ........... B64D 2013/0674; F28D 9/0068; F28D 9/0093; F28D 9/0062; F28D 21/0014; Y02T 50/50
See application file for complete search history.

(56) References Cited

U.S. PATENT DOCUMENTS

| | | | | |
|---|---|---|---|---|
| 4,844,151 A | * | 7/1989 | Cohen | F28D 9/0068 |
| | | | | 165/44 |
| 4,846,894 A | * | 7/1989 | Clem | F28G 13/00 |
| | | | | 165/95 |
| 5,442,921 A | * | 8/1995 | Chow | F28F 9/0229 |
| | | | | 165/95 |
| 5,919,406 A | * | 7/1999 | Bachofen | F24F 1/0059 |
| | | | | 261/153 |
| 6,250,061 B1 | | 6/2001 | Orlando | |
| 2002/0121103 A1 | | 9/2002 | Udobot et al. | |
| 2003/0218096 A1 | | 11/2003 | Marche | |
| 2008/0202094 A1 | | 8/2008 | Brault et al. | |
| 2014/0338334 A1 | | 11/2014 | Karam et al. | |
| 2019/0178588 A1 | * | 6/2019 | Army | F28D 7/0066 |
| 2021/0041190 A1 | * | 2/2021 | Noishiki | F28F 19/01 |

* cited by examiner

[Fig. 1]
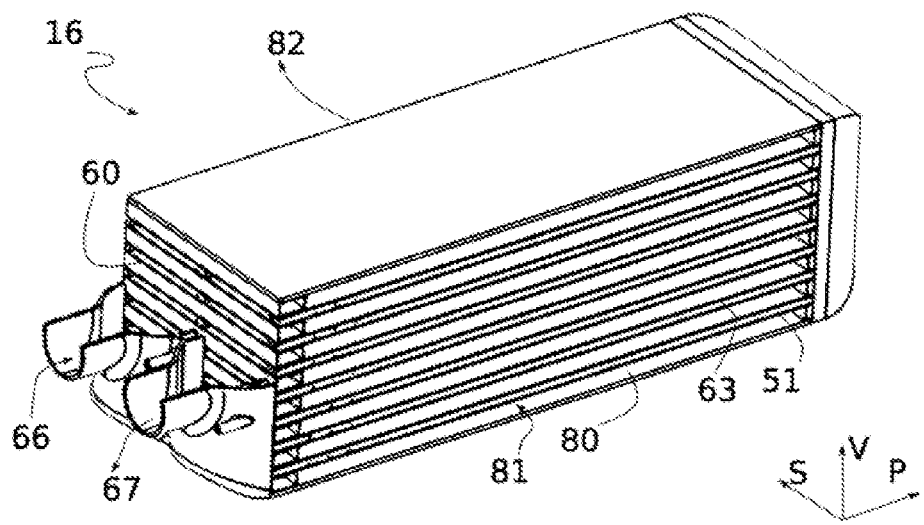
[Fig. 2]
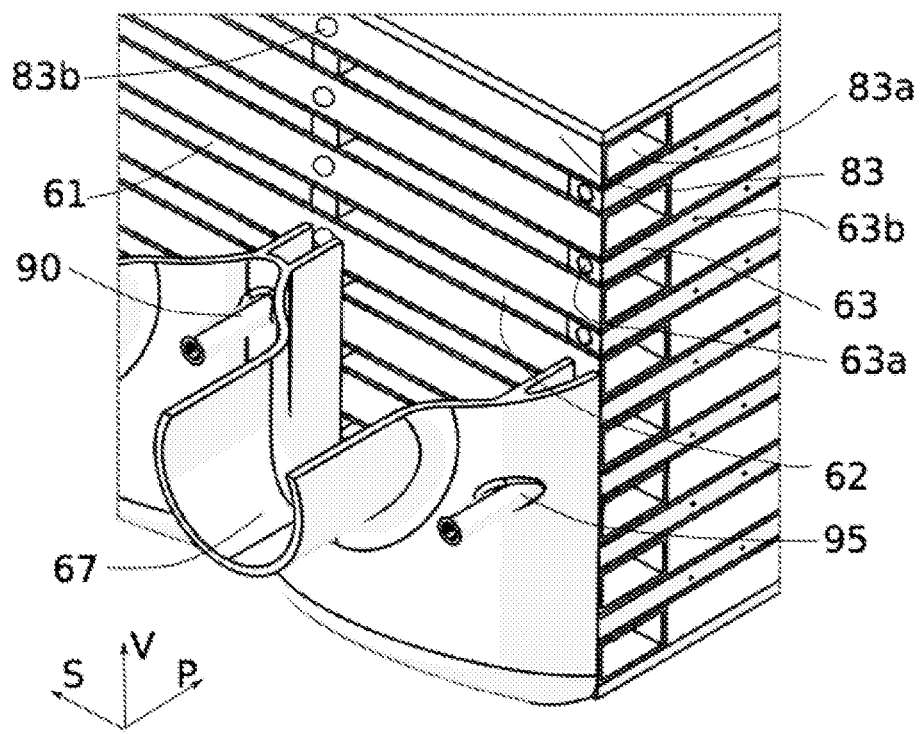

[Fig. 3]
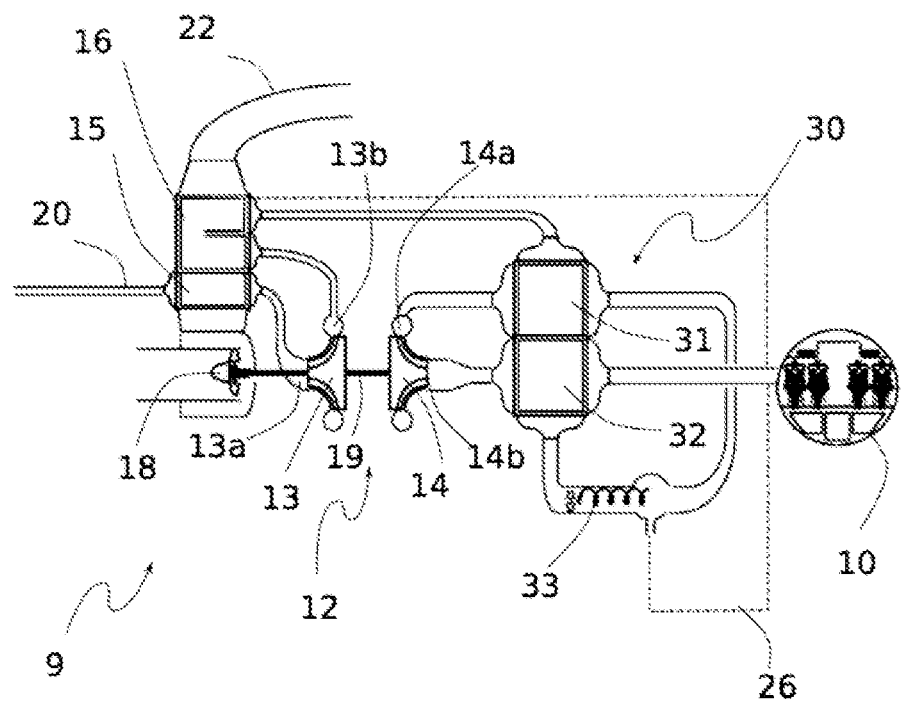
[Fig. 4]
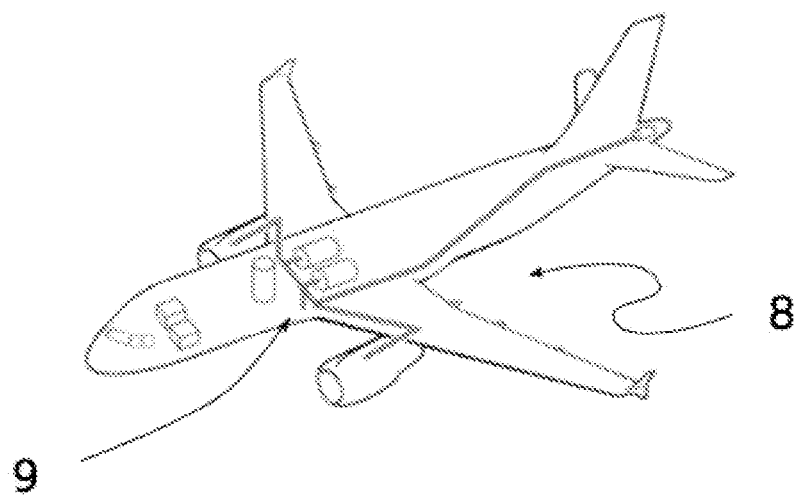

EXCHANGER FOR COOLING WARM PRIMARY AIR WITH COOL SECONDARY AIR AND SYSTEM FOR AIR CONDITIONING PROVIDED WITH SUCH AN EXCHANGER

CROSS-REFERENCE TO RELATED APPLICATIONS

This application is a § 371 national phase entry of International Application No. PCT/FR2020/050387, filed Feb. 27, 2020, which claims priority to French Patent Application No. 1902148, filed Mar. 1, 2019.

TECHNICAL FIELD OF THE INVENTION

The invention relates to an exchanger for cooling hot primary air by means of cold secondary air. The invention relates more particularly to such a cooling exchanger, which is better known under the name of primary cooling exchanger or by the acronym MHX for main heat exchanger and is intended to be provided in an air conditioning system for a cabin of an air or rail transport vehicle. The invention also relates to an air conditioning system for a cabin of an air or rail transport vehicle, the system comprising a heat exchanger of this kind.

TECHNICAL BACKGROUND

Throughout the text, the term "cabin" denotes any interior space of an air or rail transport vehicle of which the pressure and/or temperature of the air must be controlled. This may be a cabin for passengers, the pilot's cockpit of an aircraft, a hold, and in general any area of the vehicle which requires air at a controlled pressure and/or temperature. The term "turbine" denotes a rotary device for using the kinetic energy of the air to rotate a shaft supporting the blades of the turbine. The term "compressor" denotes a rotary device for increasing the pressure of the air which said device receives at the inlet.

An air conditioning system for a cabin of a transport vehicle, such as an aircraft, comprises, in a known manner, a device for bleeding compressed air from at least one compressor of an engine of the aircraft (such as a propulsion engine or an auxiliary engine of the aircraft).

Such a known air conditioning system also comprises an air cycle turbine engine comprising at least one compressor and a turbine mechanically coupled to one another, said compressor comprising an air inlet connected to said compressed-air bleed device, and an air outlet, and said turbine comprising an air inlet and an air outlet that is connected to said cabin in order to be able to supply said cabin with air at a controlled pressure and temperature.

According to an alternative, the compressor of the air cycle turbine engine is directly supplied with ambient air drawn from outside the aircraft, and the air is compressed directly by the compressor of the air cycle turbine engine.

Whatever the mode of compressed-air supply of the system, said system generally also comprises at least one heat exchanger, referred to as the main cooling exchanger, which is arranged in a channel for the circulation of ram air drawn from outside the aircraft, between said air outlet of said compressor and said air inlet of said turbine, said main exchanger comprising a primary circuit supplied with a flow of hot air from said compressor, and a secondary circuit supplied with said ram air, which forms a flow of cold air for cooling said flow of hot air.

Finally, an air conditioning system also generally comprises a water extraction loop that is arranged between said main heat exchanger and said turbine and is designed to extract water from the flow of hot air cooled by said main exchanger which supplies said turbine.

Some systems also include arranging a pipe, for distributing water extracted by said extraction loop, between said water extraction loop and water sprayers that are housed in said ram-air channel, far upstream of said main exchanger, and are designed to be able to spray this water extracted by said water extraction loop against the ram-air flow of said ram-air channel in order to promote the evaporation of said water in the air flow before the air enters the main cooling exchanger.

This injection of liquid water in the form of droplets into the ram-air circulation channel, more commonly referred to as ambient-air channel or ram-air channel, upstream of the cooling exchanger, makes it possible to lower the temperature of the air at the inlet of the cold pass of the cooling exchanger. This water, as it evaporates, absorbs heat and therefore allows the temperature of the air to be lowered.

Patent document US200911784 in the name of the applicant describes such an air conditioning system, for example. A system according to this embodiment is now widely used in a number of aircraft. However, one of the drawbacks of this solution is that it requires a large length of ram-air circulation channel upstream of the heat exchanger in order to install the sprayers therein.

The inventors sought to develop a compact heat exchanger designed in particular to be provided in an air conditioning system for a cabin of an air or rail transport vehicle, in particular a system provided with a pipe for distributing water extracted by the water extraction loop and moving to the ram-air circulation channel.

Aims of the Invention

The invention aims to provide a compact heat exchanger intended in particular to be provided in an air conditioning system of an air or rail transport vehicle.

The invention also aims to provide, in at least one embodiment of the invention, such a heat exchanger which has improved cooling performance compared with known exchangers.

The invention also aims to provide, in at least one embodiment of the invention, a compact heat exchanger that can be housed in ram-air circulation channels that are shorter than those currently required to form an air conditioning system.

The invention also aims to provide an air conditioning system for a cabin of a transport vehicle, such as an aircraft, provided with an exchanger according to the invention.

DISCLOSURE OF THE INVENTION

To this end, the invention relates to an exchanger for cooling hot primary air by means of cold secondary air, comprising:
  a plurality of channels, referred to as secondary channels, placed one on top of the other and intended for the circulation of said secondary air, each extending in the same direction, referred to as the secondary direction, between an air inlet, referred to as the secondary air inlet, and an air outlet, referred to as the secondary air outlet; and
  a plurality of channels, referred to as primary channels, for the circulation of said primary air, each interposed between two secondary channels and extending in the same direction, referred to as the primary direction, which is different from said secondary direction, between an air inlet, referred to as the primary air inlet, and an air outlet, referred to as the primary air outlet, so as to allow heat exchanges between the primary air of said primary channels and the secondary air of said secondary channels.

An exchanger according to the invention is characterized in that it further comprises:

water circulation channels, each extending adjacently to a secondary channel in said secondary direction in the vicinity of the primary air outlets, between a water inlet and a water outlet, so as to allow this water to be heated by heat exchanges with said flow of primary air of said primary channels; and water-spray micro-perforated hollow bars, each extending adjacently to a primary channel in said primary direction, between a water inlet, which is fluidically connected to at least one water outlet of said water circulation channels, and water-spray micro-perforations leading toward the secondary air inlets, so as to allow evaporation of the heated water sprayed at the inlet of said secondary channels, which thus helps to cool the flow of secondary air at the inlet of the exchanger.

The heat exchanger according to the invention has the specific feature of comprising water circulation channels each arranged along a secondary channel so as to be able to provide, when these water circulation channels are supplied with water, heat exchanges between the water circulating in the water circulation channels and the air circulating in the primary channels, and hollow water-spray bars each arranged along a primary channel so as to be able to spray the heated water directly into the flow of secondary air, at the inlet of the exchanger, which supplies the secondary channels of the exchanger.

In other words, the exchanger according to the invention makes it possible to combine the function of cooling the flow of hot primary air by means of the flow of cold secondary air (due to the presence of the nested primary and secondary channels), and the function of spraying water into the flow of cold air at the inlet of the exchanger (due to the presence of water circulation channels and hollow spray bars).

The exchanger according to the invention is designed such that the water can be sprayed directly at the inlet of the exchanger and not far upstream of the exchanger, as was the case for the systems of the prior art. This is made possible by the fact that the water is heated due to the presence of water circulation channels which are in thermal interaction with the flow of hot primary air that circulates in the primary channels. In particular, since the water is hotter than in previous systems, the water sprayed using an exchanger according to the invention evaporates more quickly than in the solutions of the prior art. This increase in water temperature therefore makes it possible to accelerate the evaporation time and therefore to limit the path that is necessary between the water spraying and the inlet of the exchanger.

An exchanger according to the invention can therefore advantageously be provided in an air conditioning system that is more compact than the systems of the prior art, in particular avoiding having to arrange the water sprayers far upstream of the exchanger.

Advantageously and according to the invention, said primary channels and said secondary channels are delimited by a plurality of parallel plates that are interconnected alternately by closure bars which extend on two opposite sides of the primary and secondary channels so as to delimit air passages, said water-spray micro-perforated hollow bars being formed by the closure bars of the primary channels extending on one side of the parallel plates in the vicinity of the secondary air inlets, and said water circulation channels being formed by the closure bars of the secondary channels extending in the vicinity of the primary air outlets.

According to this advantageous alternative, the primary and secondary channels are delimited at the top and at the bottom by plates that are arranged one on top of the other and are parallel to one another, and on each side by closure bars, referred to as primary closure bars and secondary closure bars, respectively.

In addition and according to this alternative, the hollow water-spray bars, which form lines for injecting water into the flow of secondary cold air, are integrated in the primary closure bars at the inlet mouth of the flow of cold secondary air.

According to this alternative, the water preheating function is provided by the hollow secondary closure bars at the outlet of the flow of primary hot air.

These closure bars can be of any type and depend on the intended applications and in particular on the water flow rate envisaged by the applications. These bars can be extruded tubes that are more or less wide or complex depending on the applications.

Advantageously and according to the invention, said micro-perforated hollow bars formed by said primary closure bars each comprise an internal passage which extends in the primary direction, leading into said water inlet, and micro-perforations which extend in said secondary direction from said internal passage so as to be able to be supplied by this internal passage.

Advantageously and according to the invention, said water circulation channels formed by said secondary closure bars each comprise a tube which extends in the secondary direction, leading into said water inlet, and a water outlet which extends in said primary direction.

According to other alternative embodiments, the primary and secondary channels are formed by an exchanger produced by an additive manufacturing process, such as 3D printing. According to this embodiment, the water circulation channels and the micro-perforated bars are also a direct product of the additive manufacturing process. In other words, the structure of the exchanger can, according to this embodiment of the invention, be directly obtained by an additive manufacturing process, such that the plates placed one on top of the other and the closure bars are no longer necessary for forming the primary and secondary channels, the water circulation channels and the micro-perforated hollow bars.

Advantageously and according to the invention, the exchanger comprises a water collector into which said outlets of the water circulation channels lead, and a water distributor which leads into said inlets of said micro-perforated bars, the water collector being fluidically connected to said water distributor by a connecting hose.

An exchanger according to this alternative comprises a water collector designed to receive the water coming from all the water outlets of the water circulation channels and a distributor designed to be able to distribute the water heated by the water circulation channels and collected by the collector to all the micro-perforated hollow bars.

An exchanger according to this alternative facilitates the circulation operations of water between the water circulation channels and the micro-perforated hollow bars.

Advantageously and according to the invention, the exchanger comprises a common primary air inlet leading into said primary air inlets of the primary channels and a common air outlet for primary air into which said primary air outlets of said primary channels lead.

An exchanger according to this alternative facilitates the operations of supplying the exchanger with hot primary air and of recovering the hot primary air cooled by the exchanger.

Advantageously and according to this alternative, said water collector, water distributor, common primary air inlet and common primary air outlet are formed in one piece.

Advantageously and according to the invention, said primary direction and said secondary direction are perpendicular to one another so as to form a transverse exchanger.

According to this advantageous alternative, the flow of hot air and the flow of cold air are transverse. In other words, the primary channels, in which the hot air to be cooled is intended to circulate, extend in a direction perpendicular to the direction in which the secondary channels, in which the cold air is intended to circulate, extend.

Advantageously and according to the invention, each primary channel has a general U shape such that the primary inlet is adjacent to the primary outlet.

According to this embodiment, each primary channel has the general shape of a U consisting of two legs and an end rounded connection piece which fluidically connects the two legs of the U. This makes it possible to have the primary air inlet adjacent to the primary air outlet (the ends of each of the legs of the U forming the air inlet and the air outlet, respectively) and to cool the flow of hot air twice by means of the flow of cold secondary air (each primary channel extending back and forth along the secondary channels), while limiting the size of the exchanger.

The invention also relates to an air conditioning system for a cabin of an aircraft, comprising:
- an air bleed device;
- an air cycle turbine engine comprising at least one compressor and a turbine mechanically coupled to one another, said compressor comprising an air inlet connected to said air bleed device, and an air outlet, and said turbine comprising an air inlet and an air outlet that is connected to said cabin in order to be able to supply said cabin with air at a controlled pressure and temperature;
- at least one heat exchanger, referred to as the main cooling exchanger, which is arranged in a channel for the circulation of ram air drawn from outside the aircraft, between said air outlet of said compressor and said air inlet of said turbine, said main exchanger comprising a primary circuit supplied with a flow of hot air from said compressor, and a secondary circuit supplied with said ram air, which forms a flow of cold air for cooling said flow of hot air;
- a water extraction loop that is arranged between said main heat exchanger and said turbine and is designed to extract water from the flow of hot air cooled by said main exchanger which supplies said turbine; and
- a pipe for distributing water extracted by said extraction loop, which pipe extends between said water extraction loop and said ram-air channel, upstream of said main exchanger, in order to be able to spray the water extracted by said water extraction loop into the ram-air flow of said ram-air channel.

An air conditioning system according to the invention is characterized in that said main cooling exchanger is an exchanger according to the invention and in that said water distribution pipe leads into said water circulation channels of said exchanger, said primary channels forming said primary circuit of said main exchanger, which primary circuit is supplied with a flow of hot air from said compressor, and said secondary channels forming said secondary circuit supplied with said ram air.

The system according to the invention therefore makes it possible to use an exchanger according to the invention and to supply said exchanger with water by means of the water collected by the water extraction loop of the air conditioning system.

The air conditioning system according to the invention therefore makes it possible to heat, by means of the exchanger according to the invention, the water extracted by the water extraction loop, and to inject this water at the exchanger inlet. This heating of the water makes it possible to optimize the efficiency of the evaporation of the water at the inlet of the exchanger and therefore to lower the temperature of the ram air supplying the exchanger according to the invention.

The inventors have determined that the water extracted in a water extraction loop is generally injected into the ram-air channel at a temperature of 20° C. By using an exchanger according to the invention which makes it possible to heat this water before spraying said water at the inlet of the exchanger, it is possible to bring the water to a temperature of approximately 60° C. such that the evaporation time can be divided by a factor of 13 due to the change in saturated vapor pressure.

The invention also relates to an air or rail transport vehicle comprising a cabin and to an air conditioning system for this cabin, characterized in that said air conditioning system for the cabin is a system according to the invention.

The advantages of an air-conditioning system according to the invention apply, mutatis mutandis, to an air or rail transport vehicle according to the invention.

The invention also relates to a heat exchanger, an air conditioning system, and a vehicle that are characterized in combination by all or some of the features mentioned above or below.

LIST OF DRAWINGS

Further aims, features and advantages of the invention will become apparent upon reading the following description, which is provided solely by way of non-limiting example, and which refers to the accompanying drawings, in which:

FIG. 1 is a schematic perspective view of a heat exchanger according to an embodiment of the invention;

FIG. 2 is a schematic view of a detail of the exchanger of FIG. 1;

FIG. 3 is a schematic view of an air conditioning system according to an embodiment of the invention; and FIG. 4 is a schematic perspective view of an aircraft in accordance with an embodiment according to the invention.

DETAILED DESCRIPTION OF AN EMBODIMENT OF THE INVENTION

For the sake of illustration and clarity, scales and proportions are not strictly adhered to in the drawings. Throughout the detailed description which follows with reference to the drawings, unless otherwise indicated, each element of the heat exchanger is described as it is arranged when the exchanger is housed in a ram-air circulation channel of an air conditioning system for a cabin of an aircraft and supplied with hot air from an external air bleed device (for example a device for bleeding air from a compressor of a propulsion engine of the aircraft), and with air at ram pressure drawn from outside the aircraft from a scoop.

Throughout the following description, it is thus considered that the heat exchanger is installed within an air conditioning system, it being understood that the heat exchanger according to the invention can be used for applications other than cooling high-temperature air that is bled, for example, from a propulsion engine of an aircraft. Said exchanger can in particular be provided in an air conditioning system of a rail vehicle.

Finally, identical, similar or analogous elements are denoted using the same reference signs throughout the drawings.

FIGS. 1 and 2 schematically show an exchanger 16 for cooling hot primary air by means of cold secondary air. Throughout the remainder of the detailed description, primary air is also referred to as hot air, and secondary air is also referred to as cold air. In the following, the invention is described in consideration of the fact that the hot air is air from a device for bleeding air from a compressor of a propulsion engine of an aircraft and that the cold air is ram air drawn from outside the aircraft by a scoop. This being the case, an exchanger according to the invention can of course be used in applications other than those linked to an air conditioning system of an aircraft as shown in FIG. 3.

The exchanger 16 comprises a plurality of parallel plates 51 which are placed one on top of the other and which alternately define therebetween primary channels 60 and secondary channels 80, i.e., each primary channel 60 is nested between two secondary channels 80. Preferably, the first channel starting from the bottom of the exchanger is a secondary channel 80, on top of which a transverse primary channel 60 is placed, on top of which a second secondary channel 80 is placed, on top of which a second transverse primary channel is placed, and so on, until the last channel, which is preferably also a secondary channel. Of course, the stacking order of the channels can be different without changing the principle of the invention.

Each primary channel 60 has, according to the embodiment of the drawings, a general U shape and extends between a primary air inlet 61 and a primary air outlet 62. Each leg of the U extends in a primary direction P, as shown in FIGS. 1 and 2 by the axis system (P, S, V), where P represents the primary direction, S represents the secondary direction and V represents the vertical defined by gravity.

Each secondary channel 80 extends between a secondary air inlet 81 and a secondary air outlet 82 in the secondary direction S.

In other words, the primary channels 60 and the secondary channels 80 are generally perpendicular to each other and nested in pairs so as to form heat exchange regions at each interface of a secondary channel with a leg of the primary channel.

Each primary channel 60 is further delimited by closure bars 63, also referred to as primary closure bars, which interconnect the parallel plates 51 and extend on each side of the primary channel 60 in the primary direction P.

Each secondary channel 80 is also delimited by closure bars 83, also referred to as secondary closure bars, which interconnect the parallel plates and extend on each side of the secondary channel 80, in the secondary direction S.

The primary closure bars 63 extend between a primary water inlet 63a and water-spray openings 63b. In addition, each primary closure bar 63 comprises an internal passage which extends in the primary direction P, leading into the water inlet 63a and fluidically connecting this inlet 63a and the micro-perforations formed by the spray openings 63b.

Thus, the water which supplies the inlet 63a of the closure bars 63 is sprayed through the spray openings 63b into the air flow which feeds the secondary channels 80.

The secondary closure bars 83 extend between a secondary water inlet 83a and a secondary water outlet 83b. The closure bars 83 are arranged in the vicinity of the primary air outlets 62 such that the water which supplies the inlet 83a of each closure bar is heated by the air which circulates in the primary channels 60, in the vicinity of the primary air outlet 62. These secondary closure bars 83 thus form water circulation channels. These channels can also be formed by micro-channels.

The exchanger according to the embodiment of the drawings further comprises a water collector 90 into which the outlets 83b of all the secondary closure bars 83 lead.

The exchanger according to the embodiment of the drawings also comprises a water distributor 95 which is fluidically connected to the water collector 90 by a hose (not shown in the drawings for the sake of clarity) that leads into the water inlets 63a of the primary closure bars 63.

Thus, all the water collected by the collector 90 and heated by the heat exchanges between the secondary closure bars 83 and the primary channels 60 is distributed in the primary closure bars 63 such that this heated water can be sprayed into the flow of secondary air which supplies the exchanger.

The exchanger according to the embodiment of the drawings also comprises a common primary air inlet 66 leading into the primary air inlets 61 of the primary channels 60, and a common air outlet 67 for primary air into which the primary air outlets 62 of the primary channels 60 lead.

The general operating principle of exchanger 16 is therefore as follows. Hot air, for example from an air bleed device of an aircraft, supplies the inlet 66 of the exchanger. This hot air is then distributed to the primary channels 60. Within each U-shaped channel 60, the hot air circulates in a leg of the U in the primary direction P, turns around at a rounded connection piece connecting the two parallel legs of the U, then circulates in the opposite direction in the primary direction P so as to lead into the air outlet 62 which supplies the common primary air outlet 67.

In addition, cold air, for example from a draw of air from outside the aircraft, supplies the air inlets 81 of the primary channels 80. This air circulates in the secondary channels 80, which extend in the secondary direction S, so as to exit through the outlets 82.

Since the primary channels 60 are nested together with the secondary channels 80, heat exchanges take place between the flow of hot air and the flow of cold air such that the air flow which leaves the common outlet 67 is cooled compared with the inlet air.

At the same time, water is injected into the inlets 83a of the secondary closure bars. This water preferably comes from a water extraction loop of an air conditioning system as shown schematically in FIG. 3 and described below.

This water is heated by heat exchanges between the secondary closure bars and the flow of primary air. This heated water is collected by the water collector 90 which is connected to the water distributor 95. This heated water is therefore sprayed into the flow of cold air which supplies the secondary channels 80.

This increase in water temperature therefore makes it possible to accelerate the evaporation time and therefore to limit the path that is necessary between the water spraying and the inlet of the exchanger.

Of course, nothing prevents the primary and secondary channels from being formed by an additive manufacturing process, such as 3D printing, according to other embodiments. According to this embodiment, the water circulation channels and the micro-perforated bars are also a direct product of the additive manufacturing process. In other words, the structure of the exchanger can, according to this embodiment of the invention, be directly obtained by an additive manufacturing process, such that the plates placed one on top of the other and the closure bars are no longer necessary for forming the primary and secondary channels, the water circulation channels and the micro-perforated hollow bars. The operation of an exchanger according to this embodiment of the invention is identical to that described.

An exchanger according to the invention, irrespective of its embodiment, can also be provided in an air conditioning system 9 of an aircraft for a cabin 10 of an aircraft 8 as illustrated in FIG. 3.

Such an air conditioning system 9 comprises an air cycle turbine engine 12 that comprises a compressor 13 and an expansion turbine 14 mechanically coupled to one another by a mechanical shaft 19.

The compressor 13 comprises an air inlet 13a connected to a device for bleeding compressed air (not shown in the FIG. 3 for the sake of clarity) by means of a primary cooling exchanger, also referred to as PHX (for primary heat exchanger) exchanger 15 throughout the following, and a pipe 20 fluidically connecting the air bleed device and the PHX exchanger 15.

In other words, the air from the air bleed device, which is for example a device for bleeding air from a compressor of a propulsion engine of the aircraft or a device for bleeding air from a compressor of an auxiliary engine of the aircraft, or a device for drawing air from a scoop of the aircraft associated with an intermediate compressor, supplies the compressor 13 of the air cycle turbine engine 12 after passing through a primary PHX exchanger 15. This PHX exchanger 15 comprises a hot pass formed by the air fed from the air bleed device via the pipe 20, and a cold pass supplied with air at ram pressure, which circulates in a channel 22 for the circulation of ram air, hereinafter referred to as the ram-air channel.

The ram-air circulation in the ram-air channel 22 is provided by a fan 18 mounted on the shaft 18 of the air cycle turbine engine, which shaft extends into the ram-air channel 22. According to other alternatives, the fan 18 can be separate from the shaft 19 and rotated by an independent electric motor.

The compressor 13 also comprises an air outlet 13b fluidically connected to the main exchanger 16 according to the invention, also referred to by the acronym MHX (main heat exchanger) 16 throughout the following, which is arranged in the channel 22 for the circulation of ram air drawn from outside the aircraft.

As described above, this MHX exchanger 16 comprises a hot primary circuit supplied with the air flow from the compressor 13, and a cold secondary circuit, in thermal interaction with the primary circuit, supplied with the ram air circulating in the ram-air channel 22. In other words, the air from the compressor 13 is cooled, in the MHX exchanger 16, by the ram air circulating in the ram-air circulation channel 22.

The expansion turbine 14 of the air cycle turbine engine 12 comprises an air inlet 14a supplied with air from the MHX exchanger 16 having passed through a water extraction loop 30, which will be described below, and an air outlet 14b that is connected to said cabin 10 in order to be able to supply said cabin with air at a controlled pressure and temperature.

The water extraction loop 30 comprises, according to the embodiment of the drawings, a heater 31 comprising a primary air circuit supplied with air from the main MHX exchanger 16, in thermal interaction with a secondary circuit that is supplied with air from a water extractor 33 and is intended for supplying the inlet 14a of the expansion turbine.

The water extraction loop 30 also comprises a condenser 31 comprising a primary air circuit supplied with the air flow at the outlet of the heater 31, in thermal interaction with a secondary air circuit supplied with the air flow from the expansion turbine 14, to allow condensation of the air flow of the primary circuit.

Finally, the extraction loop also comprises a water extractor 33 that is arranged at the outlet of the condenser 32 and is designed to be able to recover the water condensed by the condenser and feed said water to a water distribution pipe 26 (shown schematically as a dotted line in FIG. 3).

This water distribution pipe 26 extends between the water extractor 33 and the inlets 83a of the secondary closure bars of the exchanger 16 described above. Thus, the water recovered by the water extraction loop is directly injected into the exchanger 16 so as to be able to be heated and sprayed into the flow of cold air which supplies the exchanger 16.

Of course, an exchanger according to the invention can also be used in other applications without calling into question the principle of the invention.

The invention claimed is:

1. An exchanger for cooling hot primary air by means of cold secondary air, comprising:
    a plurality of channels, referred to as secondary channels, placed one on top of the other and intended for the circulation of said secondary air, each extending in the same direction, comprising a secondary direction, between an air inlet, comprising a secondary air inlet, and an air outlet, comprising secondary air outlet; and
    a plurality of channels, comprising primary channels, for the circulation of said primary air, each interposed between two secondary channels and extending in the same direction, comprising a primary direction, which is different from said secondary direction, between an air inlet, referred to as the primary air inlet, and an air outlet, comprising primary air outlet so as to allow heat exchanges between the primary air of said primary channels and the secondary air of said secondary channels;
    wherein said exchanger further comprises:
    water circulation channels, each extending adjacently to a secondary channel in said secondary direction in the vicinity of the primary air outlets, between a water inlet and a water outlet, so as to allow this water to be heated by heat exchanges with said flow of primary air of said primary channels; and
    water-spray micro-perforated hollow bars, each extending adjacently to a primary channel in said primary direction, between a water inlet, which is fluidically connected to at least one water outlet of said water circulation channels, and water-spray micro-perforations leading toward the secondary air inlets, so as to allow evaporation of the heated water sprayed at the inlet of said secondary channels, which thus helps to cool the flow of secondary air at the inlet of the exchanger.

2. The cooling exchanger according to claim 1, wherein said primary channels and said secondary channels are delimited by a plurality of parallel plates that are interconnected alternately by closure bars which extend on two opposite sides of the primary channels and secondary channels so as to delimit air passages, said water-spray micro-perforated hollow bars being formed by the closure bars of the primary channels extending on one side of the parallel plates in the vicinity of the secondary air inlets, and said water circulation channels being formed by the closure bars of the secondary channels extending in the vicinity of the primary air outlets.

3. The cooling exchanger according to claim 2, wherein said micro-perforated hollow bars formed by said primary closure bars each comprise an internal passage which extends in the primary direction, leading into said water inlet, and micro-perforations which extend in said secondary direction from said internal passage so as to be able to be supplied through this internal passage.

4. The cooling exchanger according to claim 2, wherein said channels formed by said secondary closure bars each comprise a tube which extends in the secondary direction, leading into said water inlet, and a water outlet which extends in said primary direction.

5. The cooling exchanger according to claim 3, wherein it comprises a water collector into which said outlets of the water circulation channels lead, and a water distributor which leads into said inlets of said micro-perforated bars, the water collector being fluidically connected to said water distributor by a connecting hose.

6. The cooling exchanger according to claim 1, wherein it comprises a common primary air inlet leading into said primary air inlets of the primary channels and a common air outlet for primary air into which said primary air outlets of said primary channels lead.

7. The cooling exchanger according to claim 5, wherein said water collector, water distributor, common primary air inlet and common primary air outlet are formed in one piece.

8. The cooling exchanger according to claim 1, wherein said primary direction and secondary direction are perpendicular to each other so as to form a transverse exchanger.

9. The cooling exchanger according to claim 1, wherein each primary channel has a general U shape such that the primary air inlet is adjacent to the primary air outlet.

10. An air conditioning system for a cabin of an aircraft, comprising:
an air bleed device;
an air cycle turbine engine comprising at least one compressor and a turbine mechanically coupled to one another, said compressor comprising an air inlet connected to said air bleed device, and an air outlet, and said turbine comprising an air inlet and an air outlet that is connected to said cabin in order to be able to supply said cabin with air at a controlled pressure and temperature;
at least one heat exchanger, comprising a main cooling exchanger, which is arranged in a channel for the circulation of rain air drawn from outside the aircraft, between said air outlet of said compressor and said air inlet of said turbine, said main exchanger comprising a primary circuit supplied with a flow of hot air from said compressor, and a secondary circuit supplied with said rain air, which forms a flow of cold air for cooling said flow of hot air;
a water extraction loop that is arranged between said main heat exchanger and said turbine and is designed to extract water from the flow of hot air cooled by said main exchanger which supplies said turbine; and
a pipe for distributing water extracted by said extraction loop, which pipe extends between said water extraction loop and said rain-air channel, upstream of said main exchanger, in order to be able to spray the water extracted by said water extraction loop into the rain-air flow of said rain-air channel, wherein said main cooling exchanger is an exchanger for cooling hot primary air by means of cold secondary air, comprising:
a plurality of channels, referred to as secondary channels, placed one on top of the other and intended for the circulation of said secondary air, each extending in the same direction, comprising a secondary direction, between an air inlet, comprising a secondary air inlet, and an air outlet, comprising secondary air outlet; and
a plurality of channels, comprising primary channels, for the circulation of said primary air, each interposed between two secondary channels and extending in the same direction, comprising a primary direction, which is different from said secondary direction, between an air inlet, referred to as the primary air inlet, and an air outlet, comprising primary air outlet so as to allow heat exchanges between the primary air of said primary channels and the secondary air of said secondary channels;
wherein said exchanger further comprises:
water circulation channels, each extending adjacently to a secondary channel in said secondary direction in the vicinity of the primary air outlets, between a water inlet and a water outlet, so as to allow this water to be heated by heat exchanges with said flow of primary air of said primary channels; and
water-spray micro-perforated hollow bars, each extending adjacently to a primary channel in said primary direction, between a water inlet, which is fluidically connected to at least one water outlet of said water circulation channels, and water-spray micro-perforations leading toward the secondary air inlets, so as to allow evaporation of the heated water sprayed at the inlet of said secondary channels, which thus helps to cool the flow of secondary air at the inlet of the exchanger,
wherein said water distribution pipe leads into said water circulation channels of said exchanger, said primary channels forming said primary circuit of said main exchanger, which circuit is supplied with a flow of hot air from said compressor, and said secondary channels forming said secondary circuit supplied with said rain air.

11. An air transport vehicle or rail transport vehicle, comprising a cabin and an air conditioning system for the cabin, wherein said air conditioning system for the cabin comprises:
a plurality of channels, referred to as secondary channels, placed one on top of the other and intended for the circulation of said secondary air, each extending in the same direction, comprising a secondary direction, between an air inlet, comprising a secondary air inlet, and an air outlet, comprising secondary air outlet; and
a plurality of channels, comprising primary channels, for the circulation of said primary air, each interposed between two secondary channels and extending in the same direction, comprising a primary direction, which is different from said secondary direction, between an air inlet, referred to as the primary air inlet, and an air outlet, comprising a primary air outlet so as to allow heat exchanges between the primary air of said primary channels and the secondary air of said secondary channels;

wherein said exchanger further comprises:

water circulation channels, each extending adjacently to a secondary channel in said secondary direction in the vicinity of the primary air outlets, between a water inlet and a water outlet, so as to allow this water to be heated by heat exchanges with said flow of primary air of said primary channels; and water-spray micro-perforated hollow bars, each extending adjacently to a primary channel in said primary direction, between a water inlet, which is fluidically connected to at least one water outlet of said water circulation channels, and water-spray micro-perforations leading toward the secondary air inlets, so as to allow evaporation of the heated water sprayed at the inlet of said secondary channels, which thus helps to cool the flow of secondary air at the inlet of the exchanger.

* * * * *